(12) United States Patent
Rivera

(10) Patent No.: US 10,584,993 B2
(45) Date of Patent: Mar. 10, 2020

(54) ADJUSTABLE SCOOP

(71) Applicant: Adrian Rivera, Whittier, CA (US)

(72) Inventor: Adrian Rivera, Whittier, CA (US)

( * ) Notice: Subject to any disclaimer, the term of this patent is extended or adjusted under 35 U.S.C. 154(b) by 297 days.

(21) Appl. No.: 15/702,695

(22) Filed: Sep. 12, 2017

(65) Prior Publication Data

US 2019/0078923 A1     Mar. 14, 2019

(51) Int. Cl.
*G01F 19/00*     (2006.01)

(52) U.S. Cl.
CPC .................... *G01F 19/002* (2013.01)

(58) Field of Classification Search
CPC ..................................... G01F 19/002
See application file for complete search history.

(56) References Cited

U.S. PATENT DOCUMENTS

| | | | | |
|---|---|---|---|---|
| 2,630,014 A * | 3/1953 | Chester | ................ | G01F 19/002 73/429 |
| 3,049,926 A * | 8/1962 | Victor | ................... | G01F 19/002 73/429 |
| 5,884,523 A | 3/1999 | Cheng et al. | | |
| 6,101,335 A * | 8/2000 | Onda | ..................... | G02B 7/102 359/698 |
| 6,481,338 B1 | 11/2002 | Wai | | |
| 2005/0017028 A1 | 1/2005 | Rea | | |
| 2008/0142228 A1* | 6/2008 | Harvey | ................... | E21B 17/04 166/378 |
| 2009/0056440 A1* | 3/2009 | Vendl | ...................... | G01F 19/00 73/429 |
| 2011/0005398 A1 | 1/2011 | Garcia et al. | | |
| 2011/0162533 A1 | 7/2011 | Fumagalli | | |
| 2012/0248138 A1* | 10/2012 | Wollach | ................ | G01F 11/023 222/1 |
| 2015/0177594 A1* | 6/2015 | Weber | ...................... | G03B 9/02 396/505 |
| 2016/0157661 A1 | 6/2016 | Torquemada | | |

FOREIGN PATENT DOCUMENTS

| | | |
|---|---|---|
| EP | 1576912 A2 | 9/2005 |
| FR | 2895660 A1 | 7/2007 |
| FR | 2900810 A1 | 11/2007 |
| WO | 2012080814 A1 | 6/2012 |

* cited by examiner

*Primary Examiner* — Clayton E. LaBalle
*Assistant Examiner* — Dennis Hancock
(74) *Attorney, Agent, or Firm* — IP Strategies

(57) ABSTRACT

An adjustable scoop includes an indexed plunger rotatable to vary a scoop volume. The plunger includes exterior spiral grooves and the scoop includes angled interior tabs which fit into the the spiral grooves. The grooves include angularly spaced apart teeth which index with the interior tabs to retain the plunger at selected depths in the scoop. Index lines are angularly spaced apart on a base of the scoop and a pointer on the plunger is alignable with each of the index lines to set the plunger depth. The plunger is substantially hollow and includes a top surface providing a floor for the scoop, and an open bottom including a horizontal bar graspable to rotate the plunger. A level is slidably attached to a scoop handle and includes a leveling arc slidable across a scoop mouth to level material contained in the scoop.

9 Claims, 3 Drawing Sheets

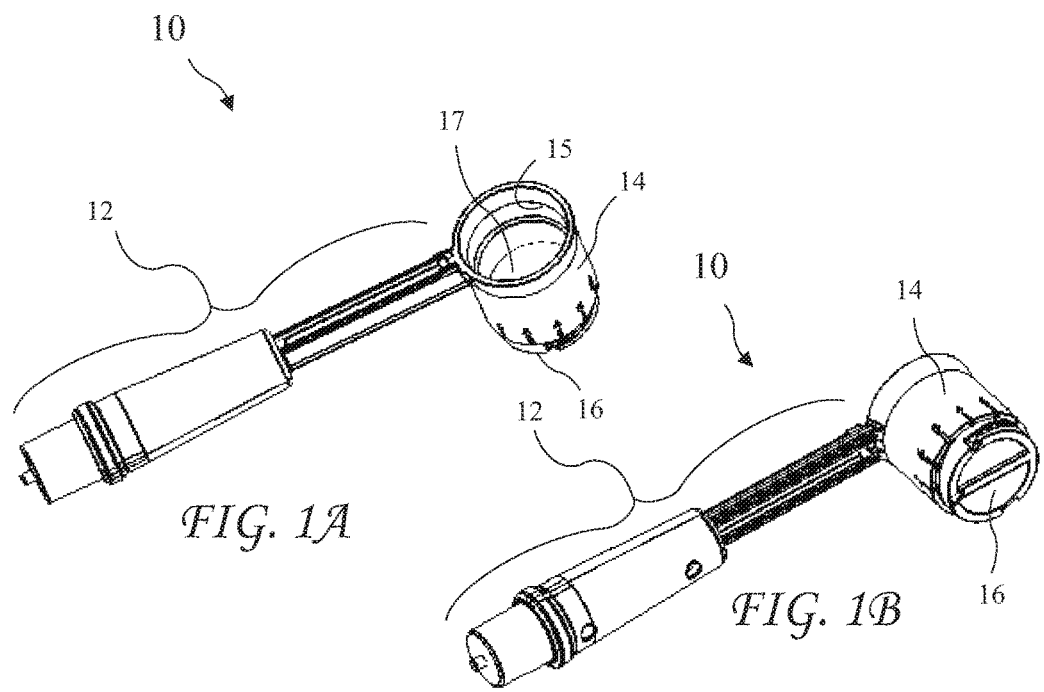
FIG. 1A
FIG. 1B
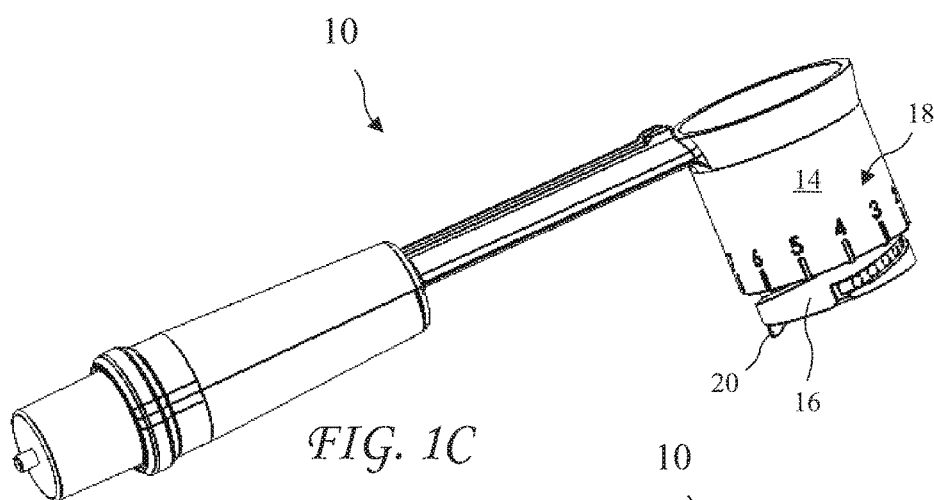
FIG. 1C
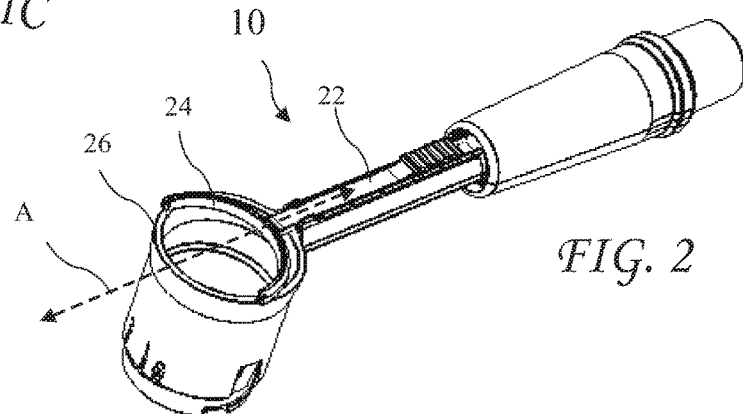
FIG. 2

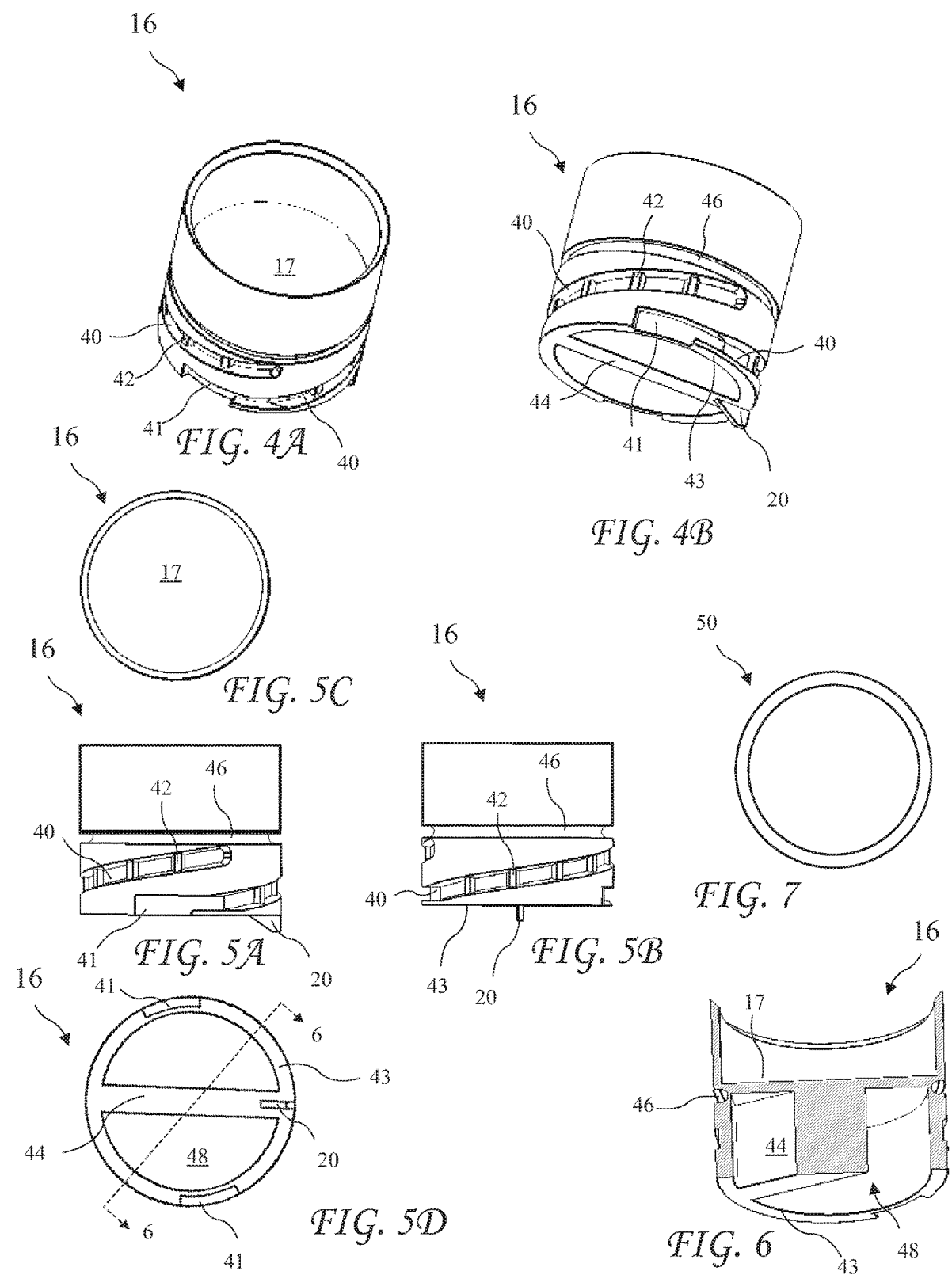

ADJUSTABLE SCOOP

BACKGROUND OF THE INVENTION

The present invention relates to scoops and in particular to adjustable volume scoops.

Cooks use various volumes of material in preparing food and drinks. Accurately measuring these volumes has required a variety of scoops to accurately measure different volumes.

In particular, single serving beverage drinks are often prepared using different amounts of different brewing material. After determining a preferred amount of a particular brewing material, it is desired to easily repeat scoop the preferred amount.

Therefore a need is present for an easy to use adjustable scoop to provide an accurate repeatable measure of various amounts of material.

BRIEF SUMMARY OF THE INVENTION

The present invention addresses the above and other needs by providing an adjustable scoop including an indexed plunger rotatable to vary a scoop volume. The plunger includes exterior spiral grooves and the scoop includes angled interior tabs which fit into the spiral grooves. The grooves include angularly spaced apart teeth which index with the interior tabs to retain the plunger at selected depths in the scoop. Index lines are angularly spaced apart on a base of the scoop and a pointer on the plunger is alignable with each of the index lines to set the plunger depth. The plunger is substantially hollow and includes a top surface providing a floor for the scoop, and an open bottom including a horizontal bar graspable to rotate the plunger. A level is slidably attached to a scoop handle and includes a leveling arc slidable across a scoop mouth to level material contained in the scoop.

In accordance with one aspect of the invention, there is provided an adjustable scoop having a moveable cylindrical plunger providing an adjustable floor in the scoop. The plunger rotates in a cylindrical interior of the scoop and rotation of the plunger is spirally coupled to vertical motion to adjust the floor height and therefore a volume of the scoop.

In accordance with another aspect of the invention, there is provided an adjustable scoop having mechanical indexing allowing consistent adjustment of a plunger and a sliding level to sweep excess material from the scoop. The indexing and leveling combine to provide added precision and repeatability to measuring material.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1A shows a top and side perspective view of an adjustable scoop according to the present invention.

FIG. 1B shows a bottom and side perspective view of the adjustable scoop according to the present invention.

FIG. 1C shows a detailed side perspective view of the adjustable scoop according to the present invention.

FIG. 2 shows a bottom and side perspective view of the adjustable scoop including a level according to the present invention.

FIG. 4A shows a top and side perspective view of a plunger according to the present invention.

FIG. 4B shows a bottom and side perspective view of the plunger according to the present invention.

FIG. 5A shows a side view of the plunger according to the present invention.

FIG. 5B shows a second side view of the plunger according to the present invention.

FIG. 5C shows a top view of the plunger according to the present invention.

FIG. 5D shows a bottom view of the plunger according to the present invention.

FIG. 6 shows a cross-sectional view of the plunger according to the present invention taken along line 6-6 of FIG. 5D.

FIG. 7 shows an O-Ring according to the present invention.

Corresponding reference characters indicate corresponding components throughout the several views of the drawings.

DETAILED DESCRIPTION OF THE INVENTION

Figure 3A:
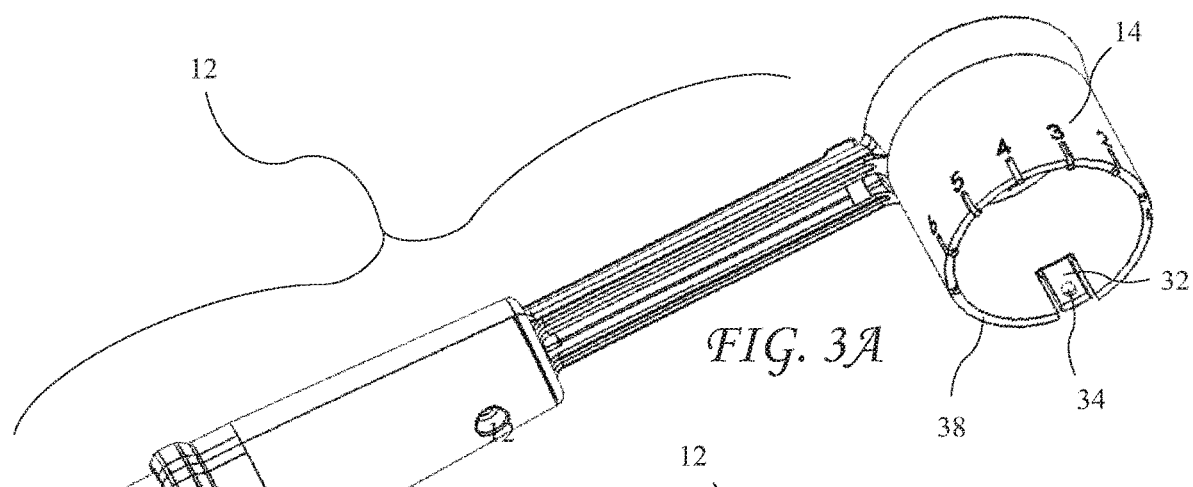
FIG. 3A shows a bottom and right side perspective view of the handle and scoop of the adjustable scoop according to the present invention.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement.

A top and side perspective view of an adjustable scoop 10 according to the present invention is shown in FIG. 1A, a bottom and side perspective view of the adjustable scoop 10 is shown in FIG. 1B, and a detailed side perspective view of the adjustable scoop 10 is shown in FIG. 1C. The adjustable scoop 10 includes a handle 12 and scoop 14. The scoop 14 has a cylindrical interior 15, and a cylindrical plunger 16 is movable inside the cylindrical interior 15 to raise and lower a floor 17 to adjust the volume of the scoop 14. A pointer 20 on the plunger 16 is alignable with index lines 18 on the scoop 14 to adjust the plunger to provide a desired volume in the scoop 14.

The adjustable scoop may further include a level 22 shown in FIG. 2. The level 22 slides on the handled 12 along arrow A and a leveling arc 24 slides across a scoop mouth 26 of the scoop 14 to level material in the scoop 16.

Figure 3B:
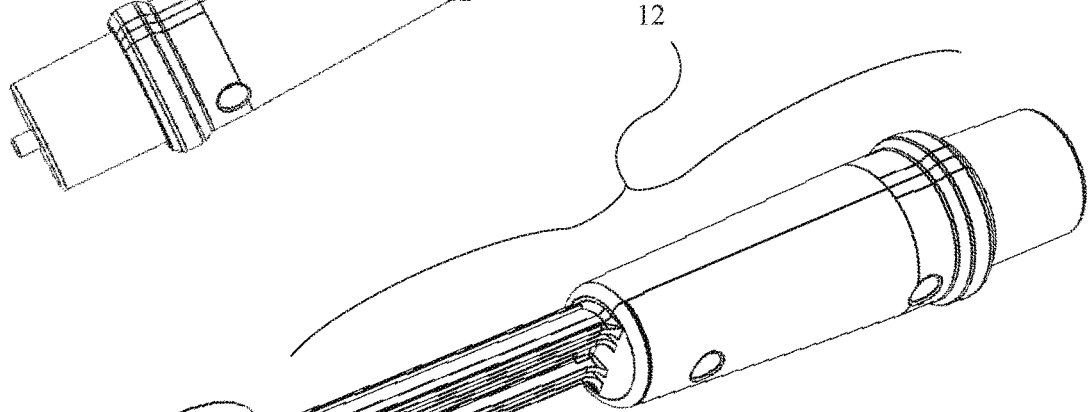
FIG. 3B shows a bottom and left side perspective view of the handle and scoop of the adjustable scoop according to the present invention.
Figure 3C:
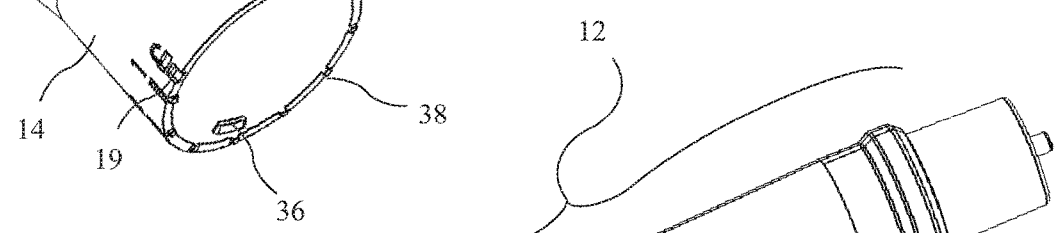
FIG. 3C shows a top perspective view of the handle and scoop of the adjustable scoop according to the present invention.
Figure 3C:
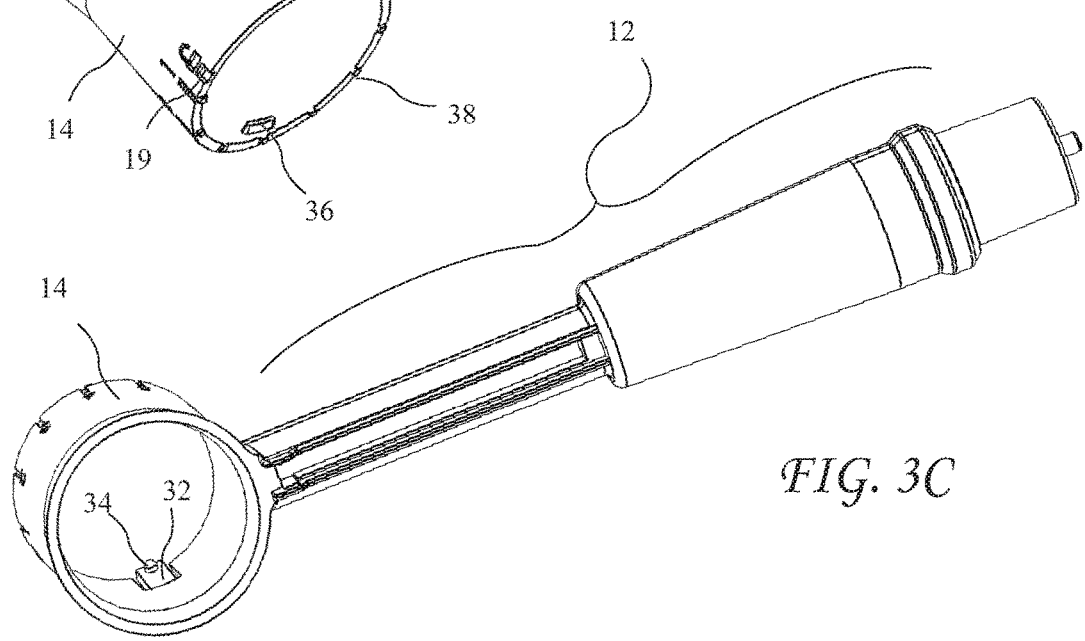

A bottom and right side perspective view of the handle 12 and scoop 14 of the adjustable scoop 10 is shown in FIG. 3A, a bottom and left side perspective view of the handle 12 and scoop 14 of the adjustable scoop 10 is shown in FIG. 3B, and a top perspective view of the handle 12 and scoop 14 of the adjustable scoop 10 is shown in FIG. 3C. The scoop 14 includes a flap 32 having an inward reaching bump 34 on the left side cut into the scoop base 38, and a tab 36 proximal to the scoop base 38 on the left side. The inward reaching bump 34 engages a plunger groove 40 (see FIGS. 4A, 4B, 5A, 5B) and the tab 36 preferably extends angularly and is tilted to match the pitch of the plunger groove 40 and also engages the plunger groove 40. The cooperation of the plunger groove 40 with the bump 34 and tab 36 thus couple rotation of plunger 16 in the cylindrical interior 15 of the scoop 14 with vertical movement of the plunger 16 in the cylindrical interior 15 to vary the volume of the scoop 14. A detachment index 19 aligns with the pointer 20 when recesses 41 (see FIGS. 4A, 4B, 5A and 5D) are aligned with the tab 36 and bump 34 allowing the plunger 16 to be removed upwardly from the scoop 14.

A top and side perspective view of the plunger 16 is shown in FIG. 4A and a bottom and side perspective view of the plunger 16 is shown in FIG. 4B. The plunger 16 includes a pair of spiral grooves 40 circling the plunger 16 and reaching to recesses 41 in the plunger base 43. The plunger 14 is insertable down into the cylindrical interior 15 of the scoop 14 through the scoop mouth 26 aligning the recessed 15 with the bump 34 and tab 36 to engage the bump 34 and tab 36 with the pair of spiral grooves 40. The plunger 16 is then rotated using a horizontal bar 44 in a concave base 48 of the plunger 16 to raise and lower the floor 17 to adjust the volume of the scoop 14. Teeth 42 in the grooves 44 cooperate with the bump 34 to provide indexing. The depth of the plunger 16 in the scoop 14 is indicated by the alignment of the pointer 20 with one of the index lines 18 on the scoop 14.

A side view of the plunger 16 is shown in FIG. 5A, a second side view of the plunger 16 is shown in FIG. 5B, a top view of the plunger 16 is shown in FIG. 5C, a bottom view of the plunger 16 is shown in FIG. 5D, and a cross-sectional view of the plunger 16 taken along line 6-6 of FIG. 5D is shown in FIG. 6. The plunger 16 includes a O-Ring groove 46 receiving an O-Ring 50 shown in FIG. 7.

While the adjustable scoop 10 is depicted with a handle, those skilled in the art will recognize variations of the adjustable scoop with the indexing described above and without a handle, and such adjustable scoops are intended to coke within the scope of the present invention. Further, the scoop 15 may be a transparent material and indices may be visible through the transparent material to observe a volume setting of the adjustable scoop.

While the invention herein disclosed has been described by means of specific embodiments and applications thereof, numerous modifications and variations could be made thereto by those skilled in the art without departing from the scope of the invention set forth in the claims.

I claim:

1. An adjustable scoop, comprising:
   a scoop body having a cylindrical interior portion;
   a plunger arranged in the cylindrical interior portion of the scoop body, wherein the plunger is rotatable in the cylindrical interior portion of the scoop body to adjust height of the plunger in the scoop body to adjust the volume of the adjustable scoop; and
   teeth and at least one cooperating profile configured to cooperate to provide rotational indexing of the position of the plunger in the scoop body;
   wherein the plunger includes at least one spiral groove arranged on a cylindrical exterior surface of the plunger;
   wherein the scoop body includes at least one tab arranged on a cylindrical interior surface and engaging the spiral groove, configured to couple the rotation of the plunger in the scoop body with adjusting the volume of the scoop; and
   wherein a bump is arranged on a flap cut into a bottom edge of the scoop body, wherein the flap is defined by two axial cuts in the scoop body extending to the bottom edge of the scoop body, wherein the flap is radially flexible to allow the bump to slide over the teeth.

2. The adjustable scoop of claim 1, further comprising a handle having a grasping end and a scoop end, wherein the scoop body is attached to the scoop end of the handle.

3. The adjustable scoop of claim 2, further comprising a level that is slidably attached to the handle, wherein the level and includes a leveling arc slidable across a mouth of the scoop.

4. The adjustable scoop of claim 2, wherein the plunger is substantially hollow, having a top surface providing a floor for the scoop body, and an open bottom including a bar graspable to rotate the plunger in the cylinder.

5. The adjustable scoop of claim 1, wherein the plunger includes two spiral grooves.

6. The adjustable scoop of claim 1, wherein the at least one groove includes the teeth, wherein the teeth are angularly spaced apart and configured to engage the bump to provide the indexing.

7. The adjustable scoop of claim 1, wherein the at least one groove extends to a recess in the bottom of the plunger, allowing the at least one tab to be engaged and disengaged from the at least one groove and the plunger to be removed upwardly from the scoop body.

8. The adjustable scoop of claim 1, wherein:
   the scoop body includes angularly spaced apart index lines; and
   the plunger includes a pointer that is alignable with each of the index lines to index the volume of the adjustable scoop.

9. An adjustable scoop, comprising:
   a handle having a scoop end;
   a scoop body arranged at the scoop end of the handle and having a cylindrical interior portion;
   a plunger arranged in the cylindrical interior portion of the scoop body;
   two spiral grooves arranged in the plunger exterior, wherein angularly spaced apart teeth are arranged in the grooves;
   a tab arranged in the scoop body interior proximal to a base of the scoop body;
   a flap arranged generally angularly opposite to the tab, wherein the flap is cut into a bottom edge of the scoop body and is defined by two axial cuts in the scoop body extending to a bottom edge of the scoop body, wherein the flap is radially flexible, thereby allowing the bump to slide over the teeth to provide the indexing;
   a bump arranged on an interior surface of the flap, wherein the tab and the bump engage the spiral grooves to couple the rotation of the plunger in the scoop body with a height of the plunger in the scoop body to adjust the volume of the adjustable scoop; and
   teeth configured to cooperate with the bump to provide rotational indexing of the position of the plunger in the scoop body.

* * * * *